Feb. 28, 1967
G. W. CORNELIUS
3,306,033
APPARATUS FOR REDUCING AIR POLLUTANTS EMITTED
FROM INTERNAL COMBUSTION ENGINES
Filed Sept. 14, 1964
4 Sheets-Sheet 1
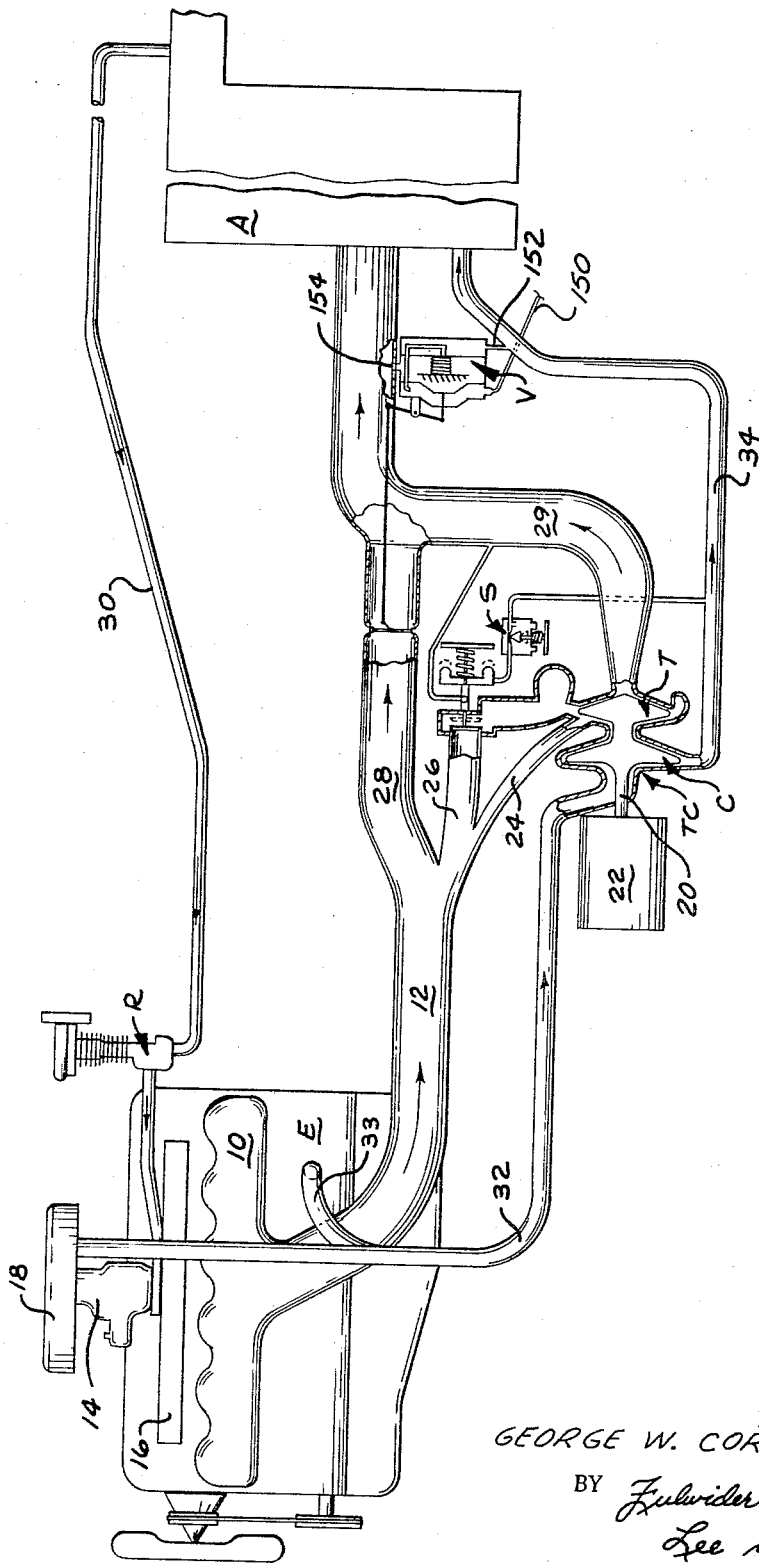
INVENTOR.
GEORGE W. CORNELIUS
BY Zulwider, Patton, Reber,
Lee and Utecht
ATTORNEYS

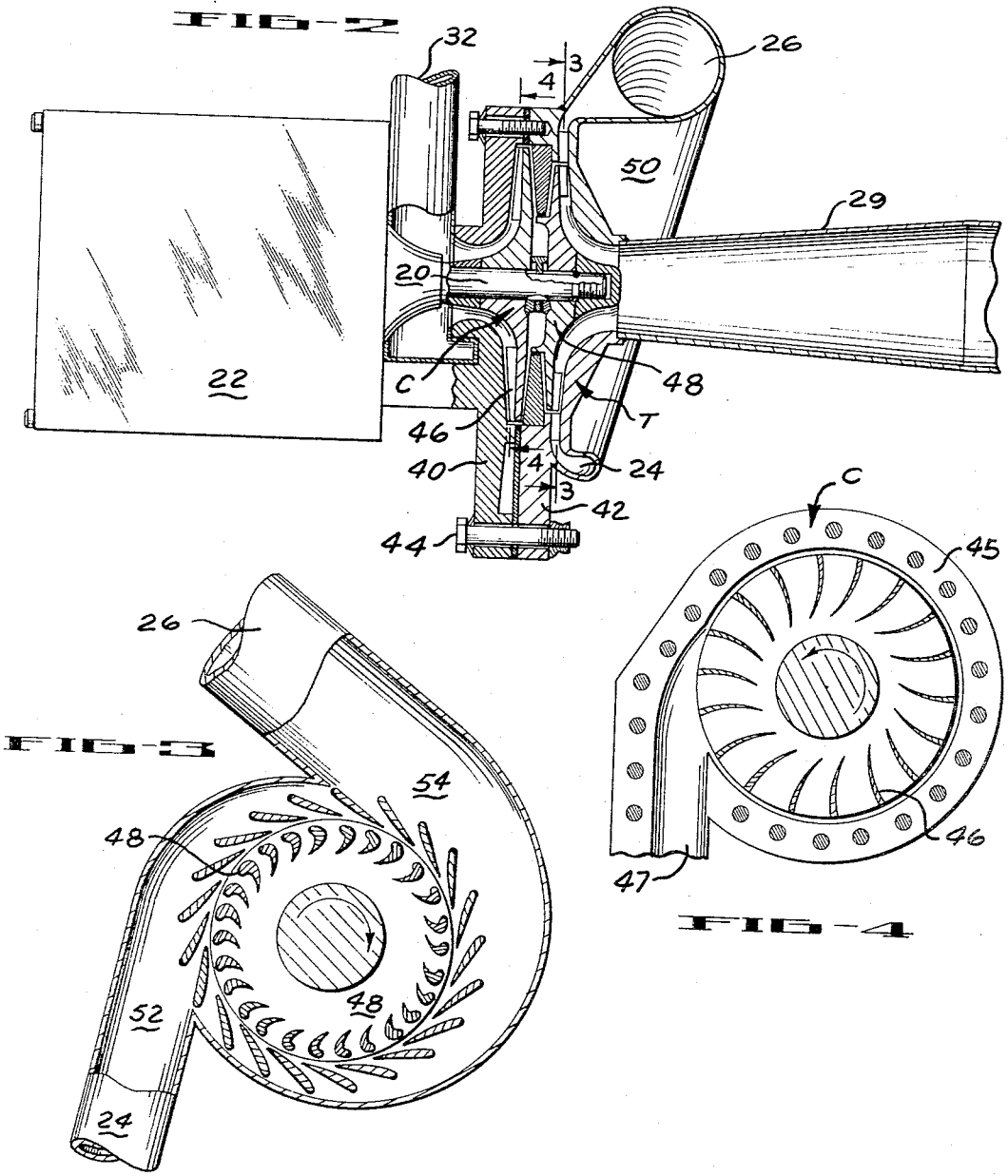

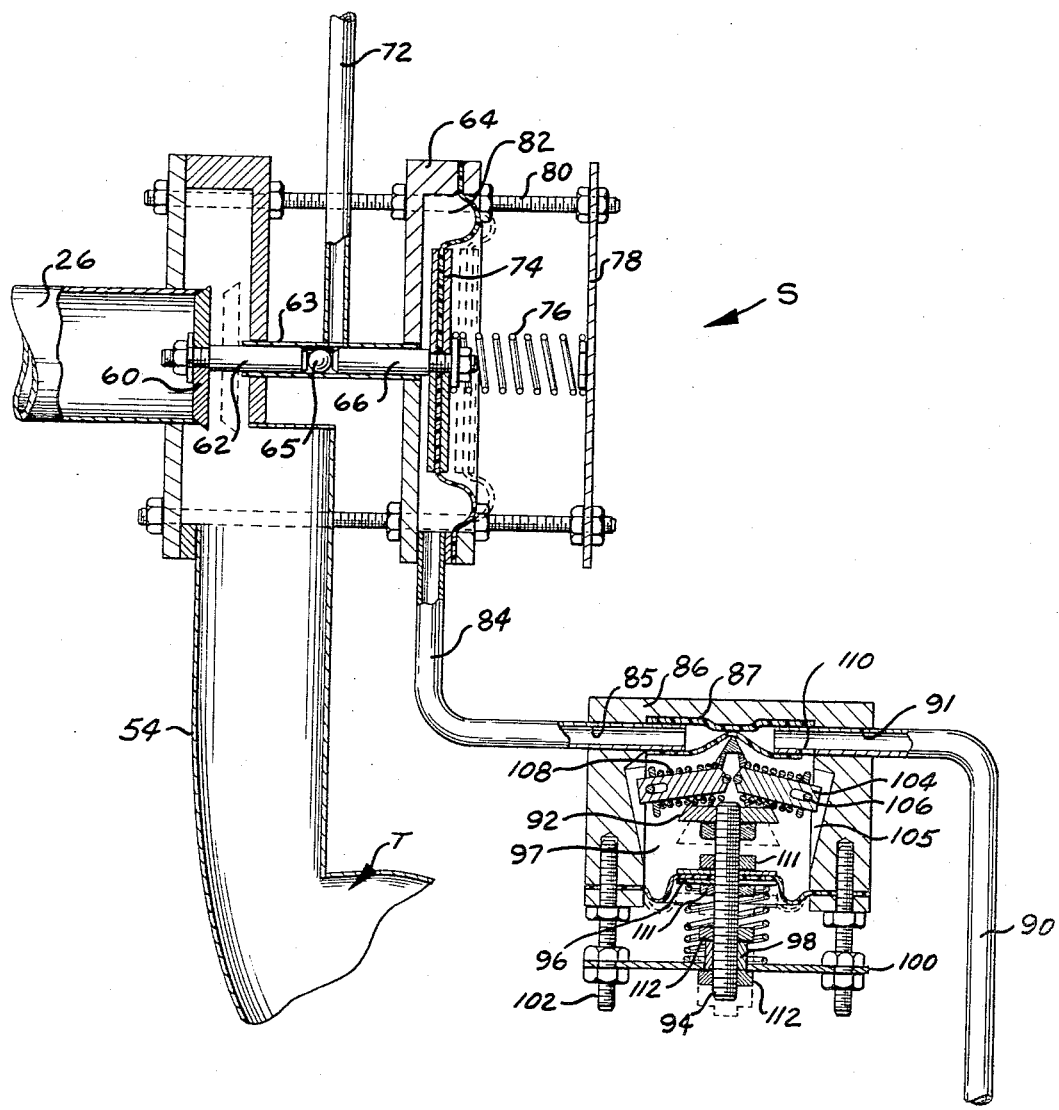
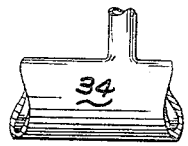
FIG-5
INVENTOR.
GEORGE W. CORNELIUS

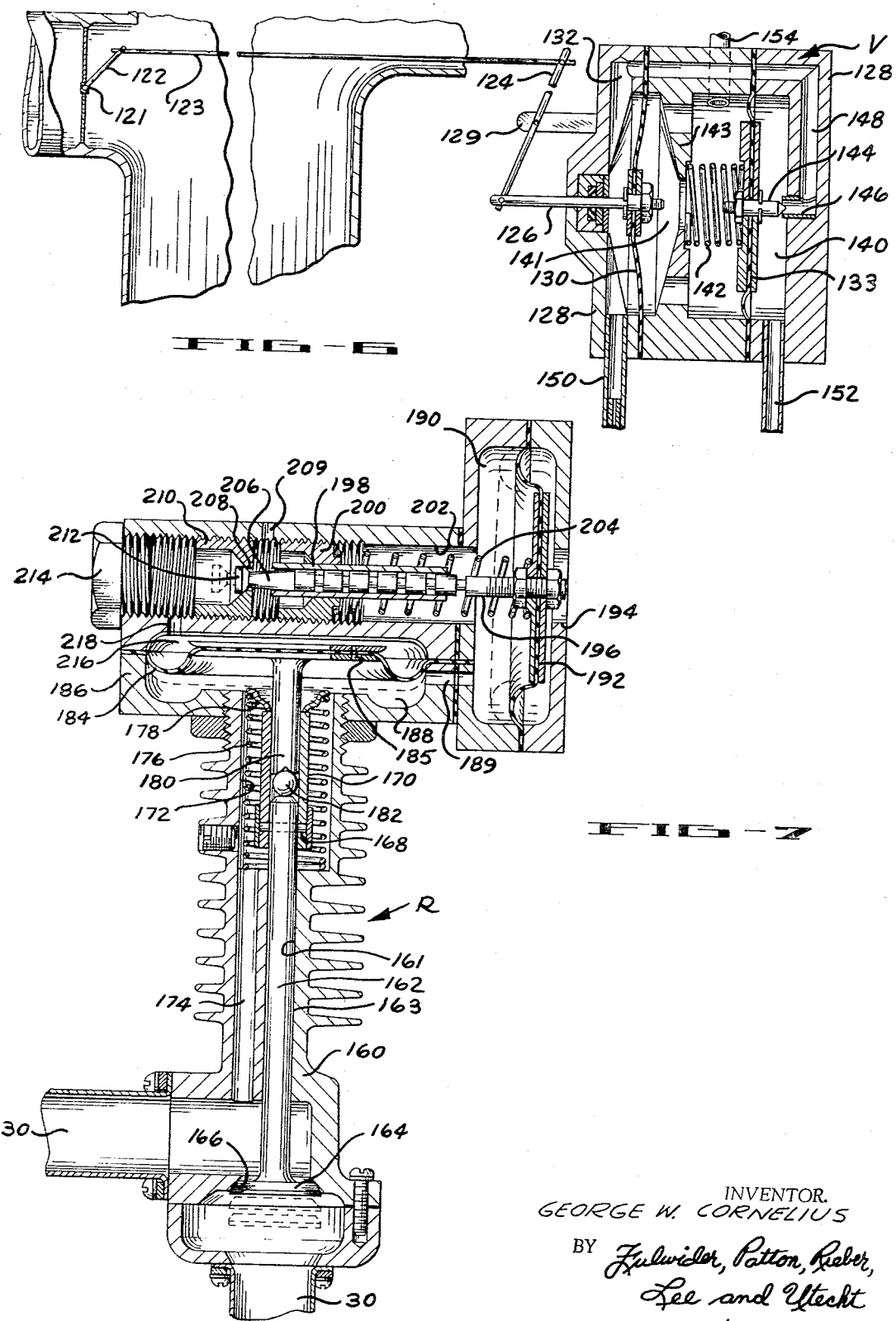

United States Patent Office 3,306,033
Patented Feb. 28, 1967

3,306,033
APPARATUS FOR REDUCING AIR POLLUTANTS EMITTED FROM INTERNAL COMBUSTION ENGINES
George W. Cornelius, 279 W. 7th St.,
San Pedro, Calif. 90731
Filed Sept. 14, 1964, Ser. No. 396,068
15 Claims. (Cl. 60—30)

The present invention relates generally to the field of internal combustion engines and more particularly to apparatus for reducing air pollutants formed in the products of combustion exhausted from an internal combustion engine.

There have been heretofore proposed many types of direct flame or catalytic type afterburners for the reduction of air pollutants emitted from internal combustion engines. Most of these afterburner devices require a source of pressurized air for their proper operation. Engine-driven blowers or compressors are utilized for providing such pressurized air. Heretofore known compressors of this nature have been driven by direct mechanical connections to the engine such as belts, gears and the like. The placement of such mechanically driven compressors gives rise to a serious problem because of the crowded nature of the space in a modern engine compartment. Direct driven compressors also fail to provide efficient operation of the afterburner since the air demands of the afterburner does not necessarily follow the r.p.m. conditions of the engine. By way of example, when an automotive vehicle undergoes a fast start, the engine r.p.m. does not match the exhaust gas volume and accordingly insufficient air would be supplied to the afterburner to effect reduction of the exhaust gas pollutants under fast start conditions. Hence, it is necessary to provide a larger compressor than would be necessary if the compressor output and the afterburner requirements were properly coordinated.

It is a major object of the present invention to provide apparatus for reducing air pollutants exhausted from an internal combustion engine that utilizes an air compressor or blower driven by a turbine, with the turbine being rotated by the exhaust gases issuing from the internal combustion engine. The output of the compressor is not positively set by the engine r.p.m. and instead may be controlled irrespective of the engine r.p.m. to provide a desired output matching the air requirements of a pollutant reducing device such as an afterburner.

A further object of the present invention is to provide apparatus of the aforedescribed nature wherein the required amount of air is obtained at a minimum expenditure of engine power or engine exhaust back pressure throughout the engine operating range from idle to wide-open-throttle, inasmuch as the compressor is never required to operate in excess of the air demands of the afterburner.

It is another object of the present invention to provide apparatus of the aforedescribed nature which may be readily installed upon the engine of any conventional automotive vehicle. Moreover, the various units of such apparatus need not be positioned at any one location within the engine compartment. Instead, the placement of these units is flexible, so as to take advantage of the availability of space within the automotive vehicle.

A further object of the present invention is to provide apparatus of the aforedescribed nature that is comparatively simple in design and rugged of construction whereby it may afford a long and trouble-free service life.

It is yet another object of the present invention to provide apparatus of the aforedescribed nature that is foolproof and entirely automatic in operation.

A particular object of the present invention is to provide apparatus of the aforedescribed nature wherein part of the exhaust gases are recycled through the intake manifold during idling and deceleration to thereby increase the efficiency and effectiveness of said apparatus.

Another object of the present invention is to provide a turbo-compressor unit driven by exhaust gases from an internal combustion engine and having control means that automatically admit a higher percentage of exhaust gases to the turbine of said unit during reduced throttle conditions of the engine than during advanced throttle conditions thereof.

These and other objects and advantages of the present invention will become apparent from the following detailed description, when taken in conjunction with the appended drawings wherein:

FIGURE 1 is a side elevational view of a preferred form of apparatus embodying the present invention operatively connected to an internal combustion engine;

FIGURE 2 is a side elevational view taken partly in central vertical section showing a turbo-compressor unit of said apparatus;

FIGURE 3 is a vertical sectional view of the turbine of said turbo-compressor unit;

FIGURE 4 is a vertical sectional view taken along line 4—4 of FIGURE 2;

FIGURE 5 is a fragmentary side elevational view in central vertical section showing a selector valve unit of said apparatus;

FIGURE 6 is a fragmentary side elevational view in central vertical section showing a bypass valve unit of said apparatus; and FIGURE 7 is a side elevational view taken in central vertical section showing an exhaust gas recycle valve unit of said apparatus.

Referring to the drawings and particularly FIGURE 1 thereof, there is shown a conventional internal combustion engine E having an exhaust manifold 10 from which extends exhaust line 12. The engine E includes a carburetor 14 that is mounted upon an intake manifold 16. A conventional air filter 18 is disposed upon the carburetor 14.

Exhaust gas effluent from the line 12 is directed to an engine accessory, such as a conventional afterburner A. The details of construction of afterburner A are not important with respect to the present invention, except that such afterburner requires a pressurized supply of air for its operation. Before entering the afterburner A the exhaust gases drive a turbo-compressor unit TC. The unit TC includes an exhaust gas-driven turbine T and an air compressor or blower C, both being mounted on a common shaft 20 that extends rearwardly from a suitable bearing housing 22. Exhaust gases from line 12 enter the turbine T through a first turbine supply line 24 and a second turbine supply line 26, with a bypass line 28 being utilized to conduct exhaust gas not directed through lines 24 and 26 to the intermediate portion of a discharge line 29 that empties into the afterburner A. The upstream end of discharge line 29 receives the exhaust gas from the outlet of turbine T.

A selector valve unit S is provided to admit an additional supply of exhaust gas through the second turbine supply line 26. A bypass valve unit V is provided to control the flow of exhaust gas through bypass line 28.

The afterburner A is connected with the intake manifold 16 by means of a recycle line 30. This recycle line 30 serves to recycle exhaust gases from the afterburner A to the intake manifold 16 under certain operating conditions of the engine E. Flow of exhaust gases through the bypass line 30 is controlled by means of a recycle valve unit R.

Air enters the compressor C from an inlet line 32 that is connected at its upstream end with the air cleaner 18. A branch line 33 connects line 32 with the crankcase of engine E to scavenge blow-by gases from the crankcase. Pressurized air from compressor C is conducted to the afterburner A by an air line 34.

Referring to FIGURES 2 and 3, the turbo-compressor unit TC includes a front casing 40 and a rear casing 42 secured together by nut and bolt combinations 44. The blower impeller 46 may be of conventional construction. Similarly, the wheel 48 of the turbine T may be of conventional construction. The interior of front casing 40 is in communication with the air line 34. The rear casing 42 is rigidly affixed to a conventional scroll 50 having communication with the second effluent line 26. Scroll 50 includes a first branch 52 having communication with the first turbine supply line 24. A second branch scroll 54 of scroll 50 is in communication with the second turbine supply line 26. It is important to note that the scroll branch 52 encircles only part of the periphery of the wheel 48 (as for example one-third) to provide a partial arc of admission, while the scroll branch 54 encircles a larger area of such periphery, as for example a 240 degree arc of admission may be thereby provided. The reason for this construction is fully set forth hereinafter.

Referring now to FIGURE 4, the casing 45 of compressor C is provided with an outlet duct 47 which is in communication with only part of the periphery of the impeller 46. This partial emission arrangement affords high efficiency at low r.p.m.

Referring now to FIGURE 5, the selector valve unit S includes a poppet valve 60 that is interposed between the second turbine supply line 26 and the scroll branch 54 of the turbine T. With the poppet valve 60 disposed in its closed position shown in solid outline in this figure, effluent is blocked against flowing into turbine scroll branch 54. The poppet valve 60 includes a rearwardly extending stem 62 horizontally slidably disposed within a tube 63 secured to valve housing 64. A ball 65 and a post 66 are also movably disposed within tube 63, ball 65 being interposed between the valve stem 62 and post 66 to minimize heat transfer along the tube. The intermediate portion of the tube 63 intersects a vertically extending leakage tube 72. The post 66 is centrally secured to a vertical diaphragm 74 having its outer periphery attached to the rear portion of the valve housing 64. A compression spring 76 is interposed between the rear of the diaphragm 74 and a retainer plate 78 that is secured to the rear end of adjustment bolts 80, such bolts being carried by the valve housing 64. The diaphragm 74 defines a pressure-sensing chamber 82 that has its lower portion in communication with a conduit 84.

The end of the conduit 84 remote from valve housing 64 is secured within the upper left-hand end of a horizontal passage 85 formed in a toggle valve housing 86. A rubber tube 87 disposed within the upper interior of toggle valve housing 86 has its left-hand end connected to conduit 84. The end of the rubber tube 87 opposite the conduit 84 is in communication with a conduit 90 that is in turn in communication with the air line 34, conduit 90 being disposed in horizontal passage 91 aligned with passage 85. The rubber tube 87 is adapted to be collapsed by means of a pointed blocking valve 92 having a stem 94 that is vertically slidably supported by the toggle valve housing 86. The intermediate portion of stem 94 is secured to the center of a horizontal diaphragm 96. The diaphragm 96 has its periphery secured to the lower portion of the toggle valve housing 86 so as to define a pressure-sensing chamber 97. The lower portion of the stem 94 is slidably disposed within a sleeve 98 supported by a plate 100 that is in turn secured by adjustment bolts 102 to the lower portion of the blocking valve housing 86. A pair of overcenter toggle fingers 104 have their proximate ends pivotally secured to the blocking valve 92. The opposite ends of the toggle fingers 104 are slidably carried by pins 106 held by spring force into grooves 105 in the inner diameter of housing 86. A pair of coil compression springs 108 encircle each of the toggle fingers 104. The pressure sensing chamber 97 in housing 86 is connected to conduit 90 by means of a port 110. Adjustment nuts 111 and 112 are provided on stem 94.

Referring to FIGURE 6, the bypass valve unit V includes a balanced throttle plate valve element 120 of the type generally termed a "butterfly" fixed to a horizontal shaft 121 carried by the sides of bypass line 28. A crank arm 122 is keyed to shaft 121 with its free end secured pivotally to a horizontal rod 123 that extends rearwardly. Shaft 121 extends through the bypass line 28 and crank arm 122 is disposed adjacent the exterior of one side of line 28. The rear end of rod 123 is pivotally secured to a second crank arm 124 having its lower end pivotally secured to a post 126 that extends through the front end of a valve housing 128. The intermediate end of arm 124 is pivotal to a bracket 129 that is fixed to the front of valve housing 128. The rear end of the post 126 is attached to a front diaphragm 130 having its periphery secured to the walls of the valve housing 128. The valve housing 128 and front diaphragm 130 define a front pressure-sensing chamber 132. A second vertical diaphragm 133 extends across the valve housing 128 rearwardly of the front diaphragm 130. This rear diaphragm 133 cooperates with the walls of the valve housing 128 to define a rear pressure-sensing chamber 140 and with said walls and front diaphragm 130 to define an intermediate pressure-sensing chamber 141. A coil compression spring 142 extends rearwardly from a spring spider 143 so as to constantly urge the rear diaphragm 133 rearwardly.

The rear diaphragm 133 centrally carries a needle valve 144. The pointed rear end of the needle valve 144 is movable into sealing engagement with the front of a metering tube 146 supported by the rear wall of the valve housing 128. A passage 148 extends from the metering tube 146 to the front pressure-sensing chamber 132. The front chamber 132 is also in communication with the atmosphere through a vent tube 150. The rear pressure-sensing chamber 140 is in communication with the air line 34 by means of a conduit 152. The intermediate pressure-sensing chamber 141 is in communication with the exhaust line 29 by means of a conduit 154.

Referring now to FIGURE 7, the recycling valve unit R includes a lower body 160 having a vertical bore 161 that slidably supports the stem 162 of a poppet valve 163, the head 164 of which is secured to the lower end of the stem 162. The valve head 164 cooperates with a valve seat 166 to block flow through the recycle line 30, valve seat 166 being formed in the lower portion of valve body 160.

The upper end of the valve stem 162 is secured by pin 168 to the lower portion of a sleeve 170. The sleeve 170 is disposed within a counterbore 172 formed in the upper portion of the valve body 160. A vertical passage 174 connects the lower end of the counterbore 172 with the pressure within recycle line 30 upstream of valve seat 166. The sleeve 170 and hence valve stem 162 are constantly biased upwardly by means of a coil compression spring 176, the upper end of this spring abutting a retainer collar 178 that is rigidly secured to the upper end of sleeve 170.

A post 180 is vertically slidably disposed within the sleeve 170. A ball 182 is interposed between the upper end of valve stem 162 and the lower end of post 180 to minimize heat transfer from the stem to the post. The upper end of the post 180 is secured to a horizontal diaphragm 184 having a bleed hole 185. The periphery of the diaphragm 184 is supported within a valve housing 186 mounted to the upper end of valve body 160. The pressure-sensing chamber 188 below the diaphragm 184 is by means of a passage 189 in communication with a second pressure-sensing chamber 190 defined by a vertically extending wall of the valve housing 186 and a vertical diaphragm 192. The side of the vertical diaphragm 192 opposite the chamber 190 is in communication with the atmosphere by a vent hole 194.

The vertical diaphragm 192 is centrally secured to a needle valve 196 that is horizontally slidably supported within a tube 198. The tube 198 is rigidly secured to a cylindrical support 200 that is positioned at the intermediate portion of a horizontal bore 202 extending through the upper portion of valve housing 186. A coil compression spring 204 extends between the vertical diaphragm 192 and the right-hand side of the support 200 so as to constantly bias needle valve 196 to the right with respect to FIGURE 7. The front portion of the needle valve 196 is tapered, as indicated at 206. The tapered needle valve portion 206 is disposed within an orifice 208 formed at the right-hand portion of an orifice bushing 210 threadably disposed within the horizontal bore 202. An air-admitting port 209 is formed in housing 186. A tapered plug 212 is formed on the end of the needle valve 206 to the left of the tapered needle valve port 208. The left-hand end of horizontal bore 202 is closed by a threaded plug 214. The left-hand portion of the horizontal bore 202 is in communication with the pressure-sensing chamber 216 disposed above the horizontal diaphragm 184 by means of a port 218.

OPERATION

In the operation of the aforedescribed apparatus, when the engine E is idling, exhaust gas effluent will flow through exhaust line 12 and the first turbine supply line 24 to the smaller branch 52 of the turbine scroll 50, flow of effluent through the second turbine supply line 26 and through bypass line 28 being blocked at this time by the valves 60 and 120, respectively, of the selector valve unit S and the bypass valve unit V, as indicated by the solid outline position of these elements in FIGURES 1, 5 and 6. Because of the fact that the turbine scroll branch 52 directs effluent to only a part of the arc of admission of the turbine wheel a high rotational velocity of the latter is obtained with the comparatively small volume of effluent exhausted from the engine E during idling. Rotational speed of the turbine wheel 48 is sufficient to obtain the necessary volume of pressurized air to satisfy the needs of the afterburner A during idling, particularly since compressor C is provided with the aforedescribed partial emission arrangement.

As the engine throttle is advanced from idling the selector valve unit S will operate so as to retract the poppet valve 60 to its open position shown in dotted outline in FIGURE 5. This permits exhaust gas to flow through the second turbine supply line 26 into the larger scroll branch 54 of the turbine T. Referring to FIGURE 5, the poppet valve 60 is retracted to its dotted outline position shown therein when the pressure within pressure-sensing chamber 82 of the valve housing 64 increases to a magnitude sufficient to overcome the compressive force of the coil spring 76. Pressure for this purpose is provided from the air supply line 34, the pressurized air from the latter entering the chamber 82 by means of conduits 90, rubber tube 87 and conduit 84. Control of pressurized air through the rubber tube 87 is effected by means of the pointed blocking valve 92 of the toggle valve housing 86, downward retraction of valve 92 permitting flow of pressurized air into the chamber 82. The pointed blocking valve 92 is caused to snap downwardly into its open position shown in dotted outline in FIGURE 5 whenever the pressure of the air flowing through the line 34 increases to the point that the diaphragm 96 of toggle valve housing 88 flexes downwardly to its dotted outline position of FIGURE 5. The pressure of the air in line 34 gradually increases as the engine throttle is advanced with a resulting increase in exhaust gas volume. It is important that the selector valve S be adjusted to open at such engine operating conditions requiring no step change setting of the bypass valve unit V, thereby avoiding turbo-compressor speed fluctuation or surging.

As the engine throttle continues to be advanced the valve 120 of the bypass valve unit V will pivotally modulate from its closed to its open position shown in dotted outline in FIGURE 6. Exhaust gas effluent will then enter the afterburner line 29 through bypass line 28 as well as through turbine supply lines 24 and 26. Referring to FIGURE 6, the valve 120 will be rotated from its closed to its open position when the pressure within rear pressure-sensing chamber 140 of valve housing 128 reaches a magnitude sufficient to overcome the compressive force of the spring 142, whereupon the rear diaphragm 133 will flex forwardly, or to the left, while the front diaphragm 130 flexes rearwardly or to the right with respect to this figure. Pressurized air is directed into rear chamber 140 from air supply line 34 by means of conduit 152. As indicated previously herein, the pressure of the air in line 34 gradually increases as the throttle of the engine E is advanced, such throttle advance effecting an increase in the volume of gases flowing to the wheel 48 of the turbine T with a consequent increase in the rotational speed of such wheel.

When the rear diaphragm 133 flexes forwardly, the needle valve 144 is unseated with respect to the metering tube 146. This permits pressurized air from air supply line 34 to flow into the front chamber 132 by means of passage 148. The intermediate chamber 141 is in communication with the exhaust gas pressure in conduit 154. The strength of spring 142 is so selected that the difference between the magnitude of the pressurized air in lines 34 and 152 and that of the exhaust gas effluent in conduit 154 will permit the rear diaphragm 133 to flex forwardly when the pressure of air in lines 34 and 152 reads a predetermined magnitude. As the rear diaphragm 133 flexes forwardly to admit pressurized air into front chamber 132 the front diaphragm 130 is caused to flex rearwardly towards its dotted line position of FIGURE 6. Such diaphragm movement effects opening of bypass valve element 120 towards its dotted line position of this figure. Opening of the bypass valve 120 controls the volume of exhaust gas effluent passing through the turbine T and consequently the maximum rotational speed of such turbine. The opening of the bypass valve also results in minimum back pressure of the exhaust gas effluent to thereby provide maximum engine efficiency.

Should the throttle of the engine E be rapidly closed, as during deceleration, with the selector and bypass valves in open position the resultant decrease in exhaust gas effluent volume passing through turbine T would cause the r.p.m. of the turbine wheel 48 to decrease. This would result in a reduction of the pressure flowing through air supply line 34. Accordingly, the pressure within pressure-sensing chamber 97 of toggle valve housing 88 would decrease to the point that the diaphragm 96 would snap upwardly thereby blocking air flow through rubber tube 87. The resultant loss of pressure in pressure-sensing chamber 82 of valve housing 64 would permit the diaphragm 74 to flex to the left with respect to FIGURE 5 so as to close the poppet valve head 60. Similarly, the valve element 120 of bypass valve unit V would be closed as the air pressure decreases within the right-hand pressure-sensing chamber 140 of valve housing 128. All or nearly all of the exhaust gas effluent would then flow through the first turbine supply line 24 so as to maintain the r.p.m. of the turbine wheel 48 at a magnitude necessary for proper operation of the compressor C in accordance with the demands of the afterburner A during deceleration.

It is desirable particularly with smaller engines to recycle exhaust gas from the afterburner A through the intake manifold 16 of engine E. The recycled exhaust gas insures adequate effluent volume for obtaining the necessary rotational speed of the turbine wheel 48 during idling and deceleration conditions.

Referring to FIGURE 7, the recycle valve unit R operates to admit exhaust gas effluent through the recycle line 30 when the intake manifold vacuum rises to a predetermined magnitude. The magnitude of the intake manifold vacuum is sensed by vertical passage 174 formed in the valve body 160. During partial throttle conditions the valve head 164 will be maintained unseated with respect to valve seat 166, as indicated by the dotted outline position of poppet valve 162 in FIGURE 7. At this time atmospheric air is drawn through orifice 208 from port 209, such air then flowing downwardly through port 218 and diaphragm bleed hole 185 into passage 174 and then into the intake manifold 16. The pressure differential across the horizontal diaphragm 184 is overcome by the upward force applied by spring 176 to the poppet valve 162. When the throttle is moved to a closed position and the intake manifold vacuum increases, the vertical diaphragm flexes to the left under the influence of atmospheric pressure and the tapered needle valve portion 206 will move toward its closed position at orifice 208. This minimizes flow of air into upper pressure-sensing chamber 216, and horizontal diaphragm 184 flexes upwardly due to the force of spring 176. This moves poppet valve head 164 upwardly toward its seat 166 to prevent excessive recycling into the high vacuum intake of the idling or deceling engine. Under heavier throttle conditions a greater valve opening is required to pass a large quantity of exhaust gas (albeit a smaller percentage of total effluent) with less vacuum to accomplish this.

The tapered end of needle 206 will be so shaped as to permit a large percentage of exhaust gas recirculation at engine idle, as for example sixty percent, and a gradually decreasing percentage (although this may for a time be an increasing absolute quantity) with increasing engine throttle setting until recycling will terminate altogether at wide open throttle so as not to impair maximum engine power output. The same recycling shutoff condition will also prevail under engine off condition to facilitate starting.

The aforedescribed apparatus will provide a supply of pressurized air for an afterburner or other engine accessory or component with minimum engine power demand during all operating conditions of the engine. Although this apparatus has been described in conjunction with an afterburner, it may be utilized to provide pressurized fluid, liquid or gas, for other devices, such as a more efficient source of power for automotive air conditioning.

Various other modifications and changes may be made without departing from the spirit of the present invention or the scope of the following claims.

I claim:
1. Apparatus for use with an internal combustion engine, comprising:
   first and second exhaust gas supply lines that receive gases from said engine;
   a turbo-compressor unit, the turbine of which is driven by exhaust gases from said supply lines;
   valve means controlling flow through said second supply line;
   and control means responsive to the compressor outlet pressure of the turbo-compressor unit for said valve means maintaining said valve means closed during reduced throttle conditions of said engine, said valve means being opened by said control means during advanced throttle conditions of said engine.

2. Apparatus as set forth in claim 1 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

3. Apparatus as set forth in claim 1 wherein said compressor is provided with an outlet duct which is in communcation with only part of the periphery of the compressor impeller.

4. Apparatus as set forth in claim 3 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

5. Apparatus for use with an internal combustion engine and an afterburner, comprising:
   first and second exhaust gas supply lines that receive exhaust gases from said engine;
   first valve means controlling flow through said second supply line;
   a bypass line connecting the exhaust of said engine with said afterburner;
   a turbo-compressor unit, the turbine of which is driven by exhaust gases from said supply lines;
   bypass valve means in said bypass line;
   control means responsive to the compressor outlet pressure of the turbo-compressor unit for each of said first valve means maintaining said valve means closed during reduced throttle conditions of said engine, said valve means being opened by said control means during advanced throttle conditions of said engine;
   and means responsive to intake manifold pressure for recycling exhaust gases through the intake manifold of said engine.

6. Apparatus as set forth in claim 5 wherein said compressor is provided with an outlet duct which is in communication with only part of the periphery of the compressor impeller.

7. Apparatus as set forth in claim 6 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

8. Apparatus for use with an internal combustion engine and an afterburner, comprising:
   first and second exhaust gas supply lines that receive exhaust gases from said engine;
   first valve means controlling flow through said second supply line;
   a bypass line connecting the exhaust of said engine with said afterburner;
   a turbo-compressor unit, the turbine of which is driven by exhaust gases from said supply and bypass lines;
   bypass valve means in said bypass line;
   control means responsive to the compressor outlet pressure of the turbo-compressor unit for each of said bypass valve means maintaining said valve means closed during reduced throttle conditions of said engine, said valve means being opened during advanced throttle conditions of said engine;
   and means responsive to intake manifold pressure for recycling exhaust gases from said afterburner to the intake manifold of said engine during reduced throttle conditions of said engine.

9. Apparatus as set forth in claim 8 wherein said compressor is provided with an outlet duct which is in communication with only part of the periphery of the compressor impeller.

10. Apparatus as set forth in claim 8 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

11. Apparatus as set forth in claim 9 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

12. Apparatus for use with an internal combustion engine, comprising:
first and second exhaust gas supply lines that receive exhaust gases from said engine;
a selector valve unit controlling flow through said second supply line;
a bypass line connected with the exhaust of said engine;
a turbo-compressor unit, the turbine of which is driven by exhaust gases from said supply lines;
and a bypass valve unit controlling flow through said bypass line, said selector and bypass valve units closing to block flow through said second supply line and said bypass line during reduced throttle conditions of said engine, said units opening during advanced throttle conditions of said engine, means for opening said selector valve unit before said bypass valve unit opens.

13. Apparatus as set forth in claim 12 wherein said compressor is provided with an outlet duct which is in communication with only part of the periphery of the compressor impeller.

14. Apparatus as set forth in claim 12 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

15. Apparatus as set forth in claim 13 wherein said turbine is provided with a scroll having a first branch encircling only a portion of the periphery of the turbine impeller and a second branch encircling a larger portion of said periphery than said first branch, said first scroll being in communication with said first supply line and said second branch being in communication with said second supply line.

References Cited by the Examiner

UNITED STATES PATENTS

| | | | |
|---|---|---|---|
| 1,583,621 | 5/1926 | Steinberg | 60—30 X |
| 2,072,881 | 3/1937 | Holm | 123—41.86 |
| 2,559,623 | 7/1951 | Holmes | 60—39.25 X |
| 3,042,014 | 7/1962 | Falzone | 123—119 |
| 3,166,895 | 1/1965 | Slayter | 60—30 X |

MARK NEWMAN, *Primary Examiner.*

RALPH D. BLAKESLEE, *Examiner.*